(12) United States Patent
Hengsterman

(10) Patent No.: US 11,050,882 B2
(45) Date of Patent: *Jun. 29, 2021

(54) APPARATUS AND METHOD FOR ACCESSING CONTACT LISTS ON AN ELECTRONIC DEVICE THAT IS UNAVAILABLE OR UNUSABLE

(71) Applicant: Stacey Hengsterman, Clifton Park, NY (US)

(72) Inventor: Stacey Hengsterman, Clifton Park, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/747,426

(22) Filed: Jan. 20, 2020

(65) Prior Publication Data

US 2020/0153962 A1     May 14, 2020

Related U.S. Application Data

(63) Continuation-in-part of application No. 16/172,355, filed on Oct. 26, 2018, now Pat. No. 10,542,142.

(60) Provisional application No. 62/578,286, filed on Oct. 27, 2017.

(51) Int. Cl.
| | |
|---|---|
| *H04M 3/42* | (2006.01) |
| *H04M 3/493* | (2006.01) |
| *G06F 21/31* | (2013.01) |
| *G06F 16/335* | (2019.01) |

(52) U.S. Cl.
CPC ........ *H04M 3/4931* (2013.01); *G06F 16/335* (2019.01); *G06F 21/31* (2013.01); *H04M 3/4938* (2013.01); *H04M 2203/353* (2013.01); *H04M 2203/554* (2013.01)

(58) Field of Classification Search
CPC ..... H04W 4/16; H04W 8/18; H04M 1/72533; H04M 3/4931
USPC ............ 379/218; 455/414.1–414.3, 416, 420
See application file for complete search history.

(56) References Cited

U.S. PATENT DOCUMENTS

| | | | |
|---|---|---|---|
| 6,170,023 B1 | 1/2001 | Beardsley et al. | |
| 7,917,474 B2 | 3/2011 | Passey et al. | |
| 8,238,537 B2 | 8/2012 | Gisby et al. | |
| 8,761,815 B2 * | 6/2014 | Xu ........................ | H04W 8/205 379/433.09 |
| 2003/0059000 A1 | 3/2003 | Burton et al. | |
| 2006/0083357 A1 | 4/2006 | Howell et al. | |

(Continued)

FOREIGN PATENT DOCUMENTS

| | | |
|---|---|---|
| EP | 1503604 A2 | 2/2005 |
| WO | 2001050720 A1 | 7/2001 |

*Primary Examiner* — Rasha S Al Aubaidi

(57) ABSTRACT

An apparatus, method, and non-transitory computer readable medium are provided for accessing data on a phone that is inaccessible. The apparatus includes a memory configured to store a plurality of contact profiles in a contact list corresponding to an inaccessible device, and a processor coupled to the memory. The apparatus receives, from an unknown device over a voice connection, an access identifier corresponding to the inaccessible device and a contact identifier associated with a contact profile of the plurality of contact profiles; identifies the contact list based on matching the access identifier with the inaccessible device; determines a contact device of the contact profile in the contact list corresponding to the contact identifier; and connects, over the voice connection, the unknown device to the contact device corresponding to the contact profile.

21 Claims, 7 Drawing Sheets

(56) References Cited

U.S. PATENT DOCUMENTS

| | | |
|---|---|---|
| 2007/0011158 A1 | 1/2007 | Parikh |
| 2008/0139210 A1 | 6/2008 | Gisby et al. |
| 2008/0151724 A1 | 6/2008 | Anderson et al. |
| 2009/0029692 A1 | 1/2009 | Radermacher et al. |
| 2009/0100027 A1 | 4/2009 | Malik |
| 2009/0290692 A1 | 11/2009 | Fong et al. |
| 2010/0153459 A1 | 6/2010 | Sousa et al. |
| 2010/0208625 A1 | 8/2010 | Logan et al. |
| 2010/0317347 A1 | 12/2010 | Burbidge et al. |
| 2011/0153668 A1 | 6/2011 | Walker et al. |
| 2011/0235790 A1 * | 9/2011 | Strope .................... H04L 51/32 379/93.02 |

\* cited by examiner

APPARATUS AND METHOD FOR ACCESSING CONTACT LISTS ON AN ELECTRONIC DEVICE THAT IS UNAVAILABLE OR UNUSABLE

CROSS-REFERENCE TO RELATED APPLICATION(S) AND CLAIM OF PRIORITY

This application is a continuation of U.S. patent application Ser. No. 16/172,355, filed Oct. 26, 2018, which claims the benefit of U.S. Provisional Patent Application No. 62/578,286 filed on Oct. 27, 2017, the disclosures of which are hereby incorporated by reference in their entirety.

TECHNICAL FIELD

This disclosure relates generally to inaccessible cellular devices. More specifically, this disclosure relates to accessing contact lists on an electronic device that is unavailable or unusable.

BACKGROUND

People are more connected via mobile devices than ever. An unintended side effect is the diminishing ability to remember facts that are easily obtainable on a cellular device or can easily be stored on a cellular device for future use.

SUMMARY

This disclosure provides for accessing contact lists on a phone that is unavailable or unusable.

In a first embodiment, an apparatus provides for accessing contact lists on a phone that is unavailable or unusable. The apparatus includes a memory that stores a plurality of contact profiles in a contact list corresponding to an inaccessible device, and a processor coupled to the memory. The processor receives, from an unknown device over a voice connection, an access identifier corresponding to the inaccessible device and a contact identifier associated with a contact profile of the plurality of contact profiles; identifies the contact list based on matching the access identifier with the inaccessible device; determines a contact device of the contact profile in the contact list corresponding to the contact identifier; and connects, over the voice connection, the unknown device to the contact device corresponding to the contact profile.

In a second embodiment, a method provides for accessing contact lists on a phone that is unavailable or unusable. The method is for an apparatus incorporating a memory and a processor, the memory configured to store a plurality of contact profiles in a contact list corresponding to an inaccessible device and the processor coupled to the memory. The method includes receiving, from an unknown device over a voice connection, an access identifier corresponding to the inaccessible device and a contact identifier associated with a contact profile of the plurality of contact profiles; identifying the contact list based on matching the access identifier with the inaccessible device; determining a contact device of the contact profile in the contact list corresponding to the contact identifier; and connecting, over the voice connection, the unknown device to the contact device corresponding to the contact profile.

In a third embodiment, a non-transitory computer-readable medium provides for accessing contact lists on a phone that is unavailable or unusable. The computer readable medium storing instruction that, when executed, causes the processor to receive, from an unknown device over a voice connection, an access identifier corresponding to an inaccessible device and a contact identifier associated with a contact profile of a plurality of contact profiles in a contact list corresponding to the inaccessible device; identify the contact list based on matching the access identifier with the inaccessible device; determine a contact device of the contact profile in the contact list corresponding to the contact identifier; and connect, over the voice connection, the unknown device to the contact device corresponding to the contact profile.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a non-transitory computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged electronic device.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

Figure 1:
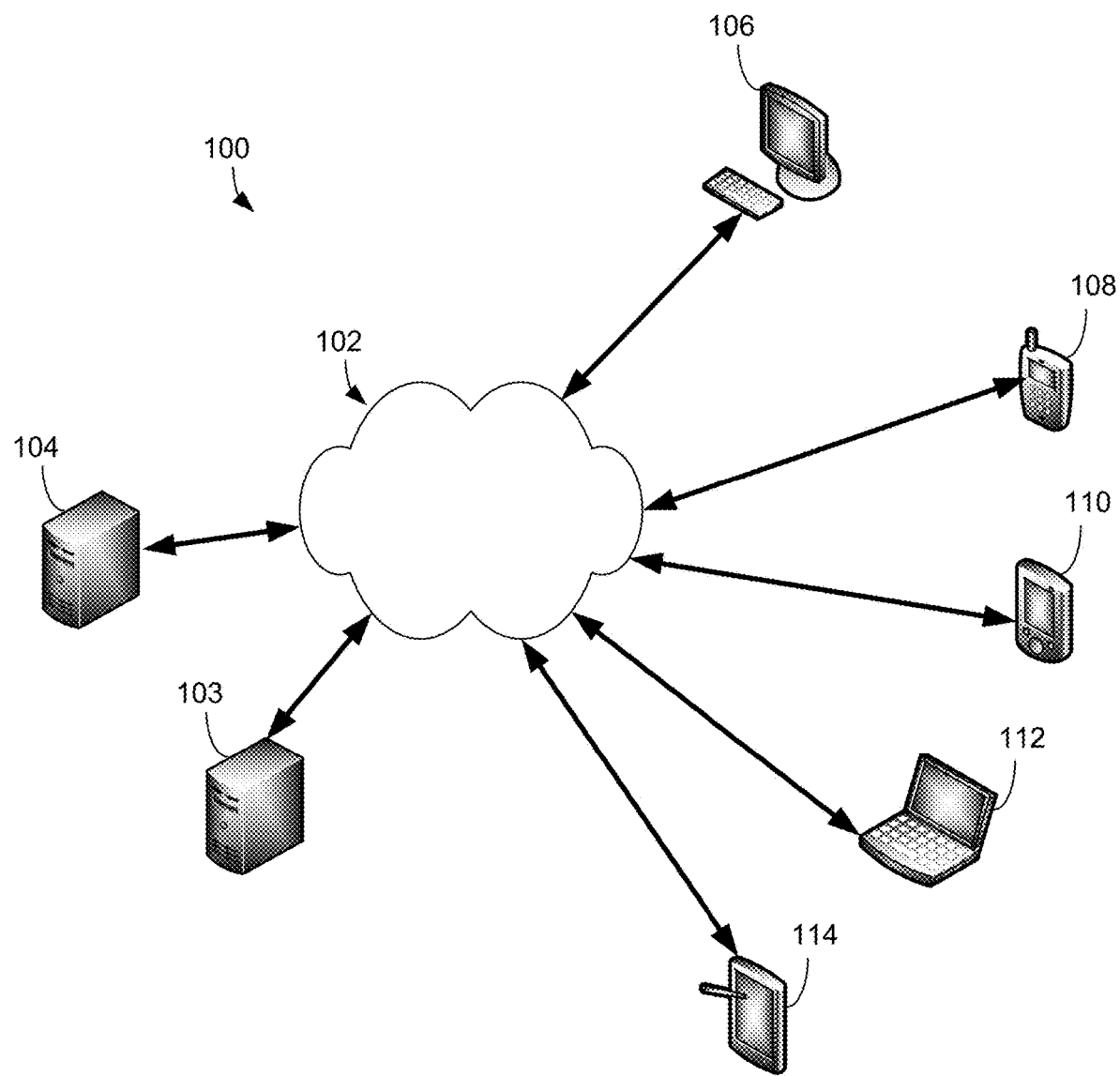
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 can communicate Internet Protocol (IP) packets, frame relay frames, or other information between network addresses. The network 102 can include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-114. Each server 103 and 104 includes any suitable computing or processing device that can provide computing services for one or more electronic devices. Each server 103 and 104 could, for example, include one or more processors, one or more memories storing instructions and data, and one or more network interfaces facilitating communication over the network 102.

Each electronic device 106-114 represents any suitable computing or communication device that interacts with at least one server or other computing device(s) over the network 102. In this example, the electronic devices 106-114 include electronic devices, such as, for example, a desktop computer 106, a mobile telephones or smartphones 108, a personal digital assistant (PDA) 110, a laptop computer 112, a tablet computer 114, a headset, a display, a wearable device, smart watch, and the like However, any other or additional electronic devices could be used in the communication system 100.

In this example, some electronic devices 108-114 communicate indirectly with the network 102, For example, the electronic devices 108-110 communicate via one or more base stations, such as cellular base stations. Also, the electronic devices 112-114 communicate via one or more wireless access points (APs), such as IEEE 802.11 wireless APs, Bluetooth, and WiFi direct. Note that these are for illustration only and that each electronic device could communicate directly with the network 102 or indirectly with the network 102 via any suitable intermediate device(s) or network(s).

As described in more detail below, the electronic devices 108-114 interact for accessing a contact list or lists on an electronic device that is unavailable or unusable. While electronic devices 108-114 are described as accessing contact lists on an electronic device that is unavailable or unusable, servers 103 and 104 could also be utilized for accessing contact lists on a phone that is unavailable or unusable. Hereinafter, the term "inaccessible" may refer to either unavailable or unusable.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
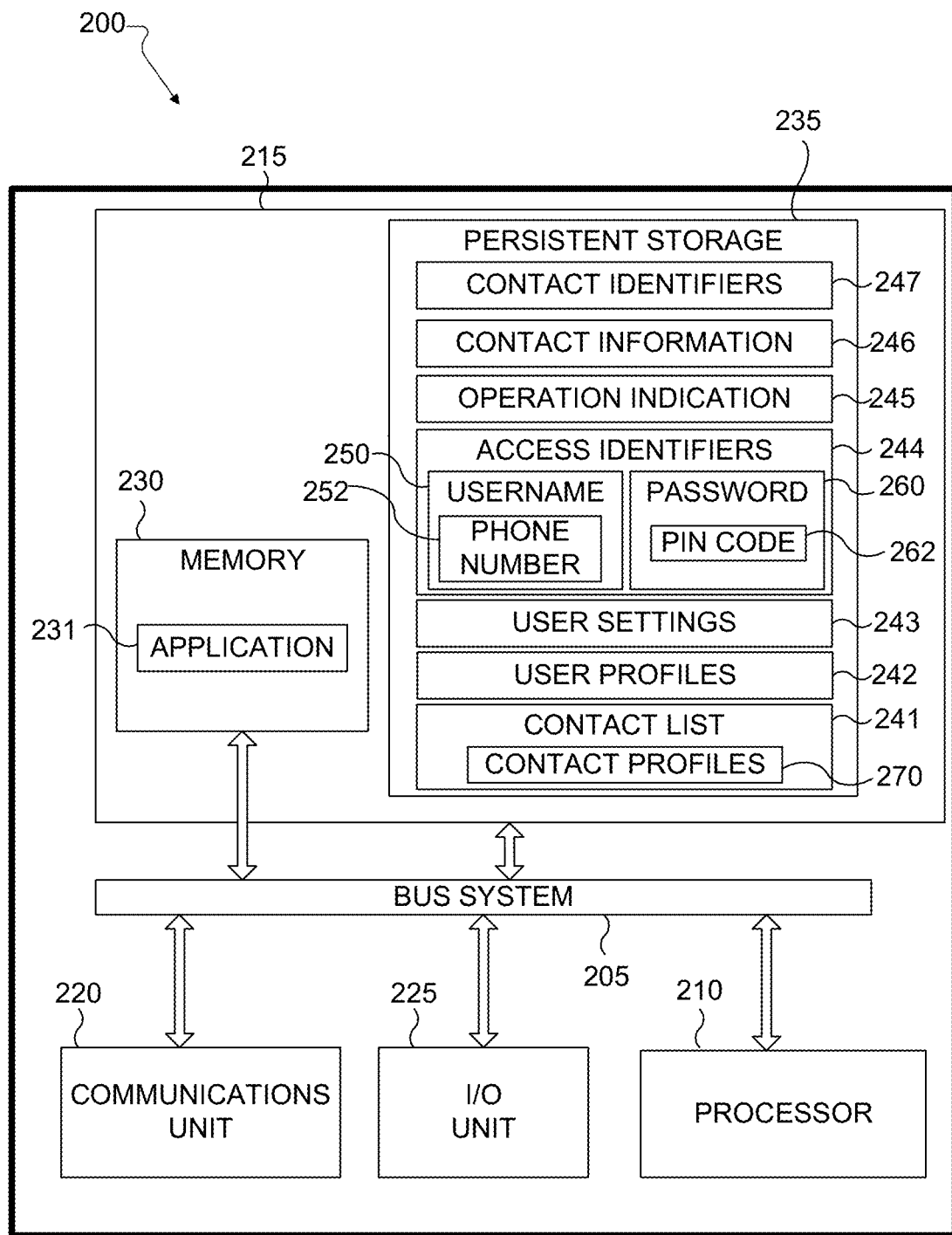
FIG. 2 illustrates an example server according to various embodiments of the present disclosure.
Figure 3:
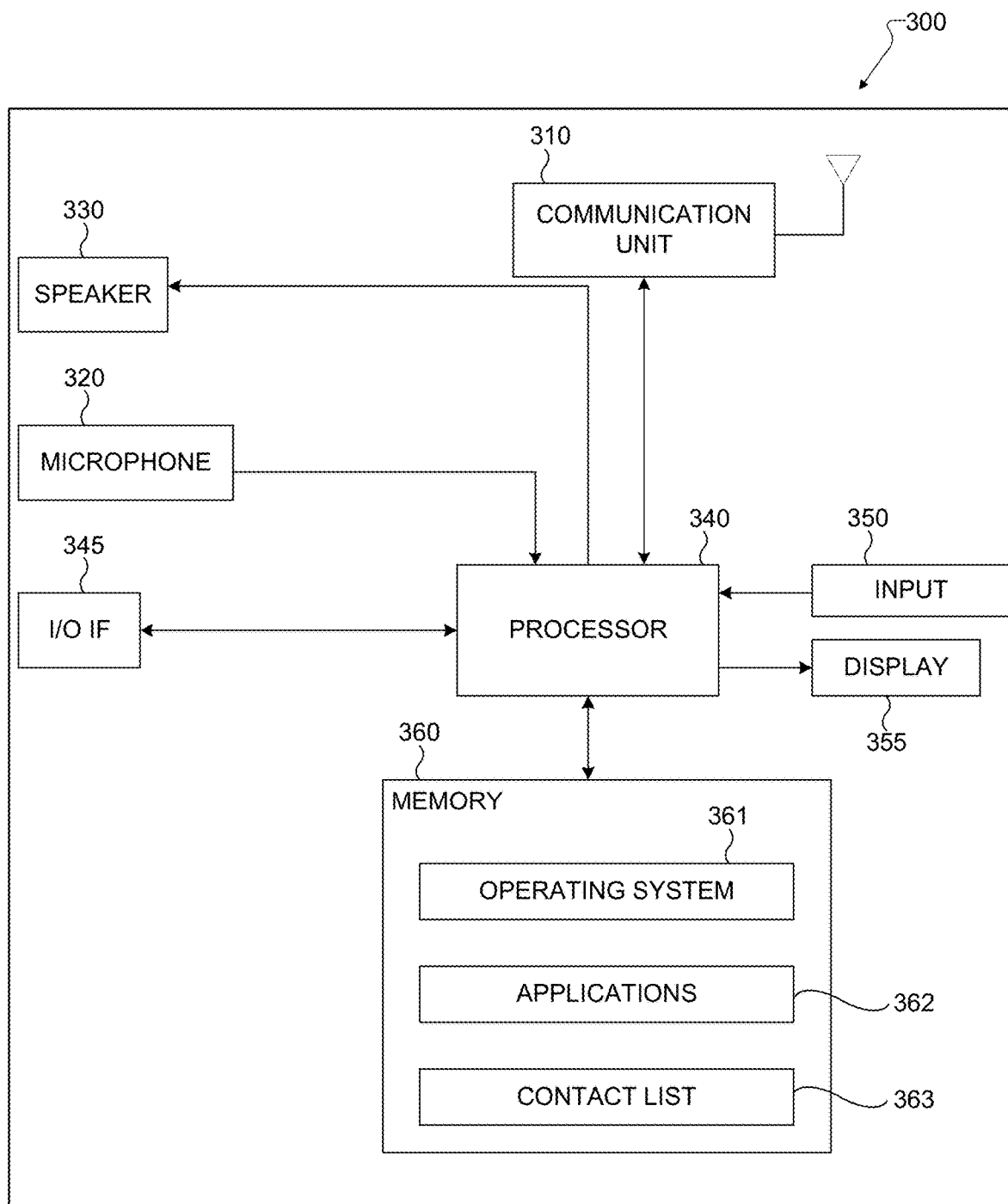
FIG. 3 illustrates an example electronic device according to various embodiments of the present disclosure.

FIGS. 2 and 3 illustrate example electronic devices in a communication system according to various embodiments of the present disclosure. In particular, FIG. 2 illustrates an example server 200, and FIG. 3 illustrates an example electronic device 300. The server 200 could represent the server 103 or the server 104 in FIG. 1, and the electronic device 300 could represent one or more of the client devices 106-114 in FIG. 1.

As shown in FIG. 2, the server 200 includes a bus system 205, which supports communication between at least one processor 210, at least one storage device 215, at least one communications unit 220, and at least one input/output (I/O) unit 225.

The processor 210 executes instructions that can be loaded into a memory 230. The processor 210 can include any suitable number(s) and type(s) of processors or other devices in any suitable arrangement. Example types of processor 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 can represent a random access memory or any other suitable volatile or non-volatile storage device(s), such as application 231. The persistent storage 235 can contain one or more components or devices supporting longer-term storage of data, such as a read only memory, hard drive, flash memory, or optical disc. The persistent storage 235 can include a contact list 241 or lists, a user profile 242 or profiles, user settings 243, an access identifier 244 or identifiers, an operation indication 245, contact information 246, and a contact identifier 247 or identifiers. In one embodiment, the memory 230 is configured to store a plurality of contact profiles in a contact list corresponding to an inaccessible device and a processor is coupled to the memory.

The server 200 receives the updates to the contact list 241 from an electronic device 300. The contact list 241 includes contact information 246 such as contact name, contact phone, contact address, contact email, or any other information generally stored in a contact list 241 on an electronic device.

The processor 210 runs the application 231 when a user calls the server directly or logs in through a web portal. The processor 210 receives an access identifier 244 from the user, which is matched with a corresponding user profile 242. The processor 210 also receives an operation indication 245. The processor 210 performs the operation associated with the operation indication 245, which for example could include returning contact information 246 associated with the contact list 241.

The contact list 241 contains any relevant information stored in an electronic device related to a contact list or group of contact lists. The contact list 241 can also contain any relevant information related to an individual contact. For example, the contact list 241 can store user profiles, group profiles, etc. The contact list 241 can also store calendar entries, event reminders, notes, messages, and photos. The server 200 can be configured to search multiple databases on the inaccessible electronic device for contact information 246 associated with the contact list 241, including contact information 246 locally stored on the inaccessible electronic device. For example, the contact list 241 can be formed from a phone contact list, an email contact list, a social media contact list (FACEBOOK, LINKEDIN, etc.), or any other list found on an electronic device. The server 200 can also be configured to update the contact list 241 stored on the database when the contact information 246 compiled from multiple different sources has been modified. For instance, contact information 246 may be modified when a contact is added or deleted. Contact information 246 may also be modified when information on an existing contact is added or removed (e.g., adding a second phone number to an existing account, removing a work email from an existing account, or updating a phone number on an existing account). In one embodiment, the contact list 241, prior to telecommunication with the server 200, is locally stored on the initial device. The contact list 241 can also remain locally stored on the electronic device after telecommunication with the server 200. In one embodiment, the contact list 241 includes contact profiles 270. The contact list 241 can also contain a plurality of contact profiles. The contact identifier is associated with a contact profile 270 of the plurality of contact profiles.

The user profile 242 can include any necessary information for identifying the user related to a specific account. The user profile 242 can include any user name, user phone number, user email, user address, user payment information, etc.

The user settings 243 include the settings set by the user in regards to accessing the application, updating the application, and performing operation using the application. The user settings 243 are set on the initial device that is at some point inaccessible. For example, the initial device may become inaccessible because the user left his/her smartphone at home. The initial device may also become inaccessible because the user's smartphone screen has cracked, the user's smartphone fingerprint scanner is broken, the user's smartphone touch screen has become unresponsive, or one or more buttons on the user's smartphone has become damaged. The user settings 243 also can be set from a computer or application logged into from a different electronic device.

The access identifier 244 can identify the user when accessing the server 200. In one embodiment the access identifier includes a username 250. The access identifier 244 can also be an alphanumeric code, a name, a caller ID, or any other set of characters and numbers for individually identifying a user. In one embodiment, the username 250 includes a phone number 252. The username 250 can also be an alphanumeric code, name, a caller ID, or any other set of characters and numbers for individually identifying a user. Each user can have a single access identifier 244 for all purposes of accessing the application or different access identifiers for accessing the application in different manners. For example, an access identifier 244 can be set for accessing the application 231 from a known source or for full functionality and a second access identifier 244 can be used when accessing from an unknown source, such as a random person's electronic device. The access identifier 244 can be sent to the server 200 via text message, phone call, email, or any other appropriate form of communication. The access identifier 244 can also include a password 260. In one embodiment, the password 260 is a PIN code 262. The password 260 can also be an alphanumeric code, a caller ID, or any other set of characters and numbers for individually identifying a user.

The operation indication 245 can indicate the operation to be performed by the application based on the interaction. For example, the operation indication 245 can indicate operations to provide specific contact information 246 back to the user or attempt to contact a specific user or group of users. The operation indication 245 can also indicate any specific means of communication to use in the operation. For example, the operation indication 245 can indicate setting up a phone call or group call, can indicate sending a text or email to a single contact or a group of contacts, can indicate setting up a video chat session, etc.

The contact information 246 can include contact name, contact number, contact address, contact email, contact birthday, contact groups, etc. A user profile 242 can include multiple amounts of the relevant information, such as multiple contact numbers (home phone, work phone, cell phone, etc.).

The contact identifier 247 can identify a specific contact or a group of contacts. The user can specifically set up the contact identifier information on the application or the contact identifier 247 can be determined by the application 231. The contact identifier 247 is provided to identify the specific contact or the group of contacts for the operation to be conducted. For example, the contact identifier 247 can identify the group of contacts that the user is attempting to reach by the specified operation. The contact identifier 247 can be sent to the server 200 via text message, phone call, email, or any other appropriate form of communication. In one embodiment, the server 200 is configured to receive a text message from an electronic device and analyze the text message to identify the access identifier 244 and the contact identifier 247.

The communications unit 220 supports communications with other systems or devices. For example, the communications unit 220 could include a network interface card or a wireless transceiver facilitating communications over the network 102. The communications unit 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 also can send output to a display, printer, or other suitable output device.

As described in more detail below, the processor 210 manages the user profile 242 and contact list 241 on the server 200. The processor 210 runs the application 231 to connect a user corresponding to an authenticated profile to one or more of the contacts in the contact list 241.

In one embodiment, the server 200 is configured to receive an access identifier 244 associated with a user and a contact identifier 247 associated with a contact list 241. The server 200 can access the contact list 241, wherein the contact list 241 is locally stored on an inaccessible electronic device associated with the user and not externally stored on a cloud storage system. The server 200 can also perform an operation based on the contact identifier 247. For instance, performing an operation may include sending phone calls, text messages, emails, or other forms of contact. The application 231, in connection with the server 200, can also be configured to perform a default action, such as initiating a phone call, when the server 200 receives an access identifier 244 and a contact identifier 247 from the unknown device 406. The application 231, in connection with the server 200, can also be configured to give a list of operations to choose from when the server 200 receives an access identifier 244 and a contact identifier 247 from the unknown device 406.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the electronic device 300 includes an antenna 305, a communication unit 310, and a microphone 320. The electronic device 300 also includes a speaker 330, a processor 340, an input/output (I/O) interface (IF) 345, an input 350, a display 355, and a memory 360. The memory 360 includes an operating system (OS) program 361, one or more applications 362, and any contact list 363 associated with the electronic device.

The application 362 automatically transmits contact information 246 to the server 200 when the contact information 246 is entered or updated on the electronic device 300. The application 362 also provides customizable settings.

The communication unit 310 may receive an incoming RF signal such as a Bluetooth® or Wi-Fi® signal. The communication unit 310 may down-convert the incoming RF signal to generate an intermediate frequency (IF) or baseband signal, then generate a processed baseband signal by filtering, decoding, and/or digitizing the baseband or signal. The communication unit 310 transmits the processed baseband signal to the processor 340 for further processing (such as for web browsing data, online gameplay data, notification data, or other message data).

The communication unit 310 also receives analog or digital voice data or other outgoing baseband data (such as web data, e-mail, or interactive video game data) from the processor 340. The communication unit 310 encodes, multiplexes, and/or digitizes the outgoing baseband data to generate a processed baseband or IF signal. In the case that the communication unit 310 is an RF transceiver, the communication unit 310 up-converts the baseband or IF signal to RF signal that is transmitted via an antenna.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310 in accordance with well-known principles. The processor 340 could also receive analog or digital voice data from the microphone 320, and output analog or digital audio to the speaker 330. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display 355. The operator of the electronic device 300 can use the input 350 (e.g., keypad, touchscreen, button and the like) to enter data into the electronic device 300. The display 355 can be a liquid crystal display, a light-emitting diode (LED) display, an optical LED (OLED), an active matrix OLED (AMOLED), or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the processor 340 allows for accessing a contact list on a phone that is inaccessible. The electronic device 300 provides for accessing a contact list on a phone that is inaccessible.

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, electronic devices and servers can come in a wide variety of configurations, and FIGS. 2 and 3 do not limit this disclosure to any particular electronic device or server.

Figure 4:
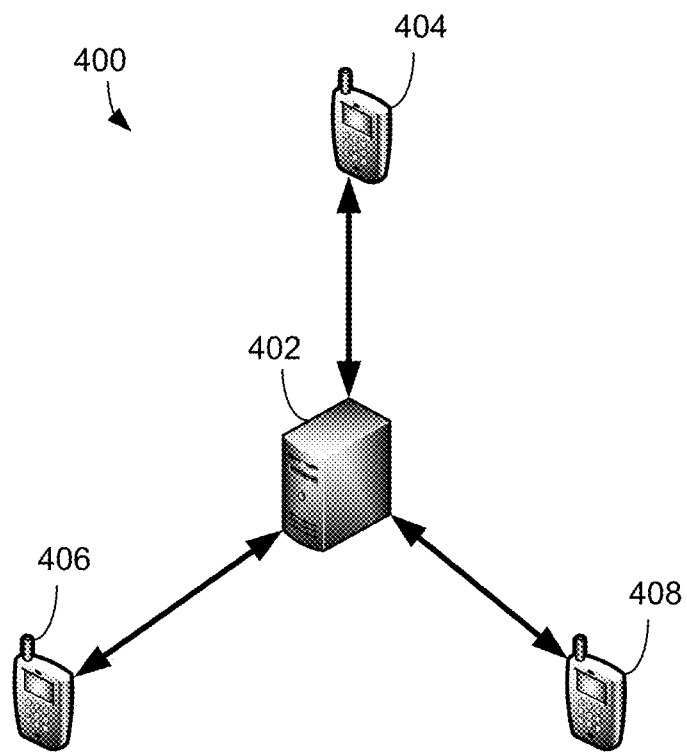
FIG. 4 illustrates an example process for setting up an accessible contact list with the application according to various embodiments of the present disclosure.

FIG. 4 illustrates an example communication system 400 in which various embodiments of the present disclosure may be implemented. The embodiment of the communication system 400 shown in FIG. 4 is for illustration only. Other embodiments of the communication system 400 could be used without departing from the scope of this disclosure.

As shown in FIG. 4, the system 400 includes a server 402, an inaccessible device 404, an unknown device 406, and a contact device 408.

The inaccessible device 404, the unknown device 406 and the contact device 408 can represent any suitable computing or communication device that interacts with at least one server or other computing device(s) over a network, such as the network 102. In this example, the inaccessible device 404 includes an electronic device, such as a cell phone, that is a functioning device that a user is unable to operate due to malfunction of an interface or misplacement of the functioning device. The unknown device 406 includes an electronic device, such as a cell phone, that the server 200 has not previously communicated with. In one embodiment, the unknown device 406 is a stranger's smartphone that the user is borrowing to call the server 200. The contact device 408 includes an electronic device, such as a cell phone, corresponding to a contact on the contact list 241.

Before the inaccessible device 404 becomes inaccessible, the server 402 receives a contact list from the device. The contact list on the server 402 can be automatically synced or manually synced. The server 402 can receive or assign an access identifier to the contact list.

The server 402 operates to provide access to contact lists from an inaccessible device 404 to a user that is making a voice call from an unknown device 406. The voice call can be through wired communication, wireless communication, data communication. VOIP communication, etc.

The unknown device 406 can place a call to the server 402. The server 402 prompts the unknown device 406 for the access identifier. The access identifier can include a username and a password. The username is used to identify the specific contact list corresponding to the inaccessible device 404. The password is matched with a stored password to gain access to the contact list. If the passwords do not match, the server 402 can terminate the voice communication or re-prompt the user for a different access identifier combination.

Once the password is matched with the stored password, the server 402 can identify a specific contact in the contact list using the contact identifier. The contact identifier can be verbally received by the server 402 and proceeds to convert the verbal contact identifier to determine the contact. If the server 402 locates the contact, the server 402 can provide or repeat the name to the unknown device for confirmation or in general. If the contact is not confirmed, other options of contacts with similar names can be provided or the unknown device can be re-prompted for a new contact identifier.

When the contact s confirmed, the server 402 can initiate a voice call with the contact device 408 associated with the contact or contact identifier. The server 402 can provide the caller information of the inaccessible device 404 to the contact device 408.

Although FIG. 4 illustrates one example of a communication system 400, various changes may be made to FIG. 4. For example, the system 400 could include any number of each component in any suitable arrangement. In general, computing and communication systems come in a wide variety of configurations, and FIG. 4 does not limit the scope of this disclosure to any particular configuration. While FIG. 4 illustrates one operational environment in which various features disclosed in this patent document can be used, these features could be used in any other suitable system.

Figure 5:
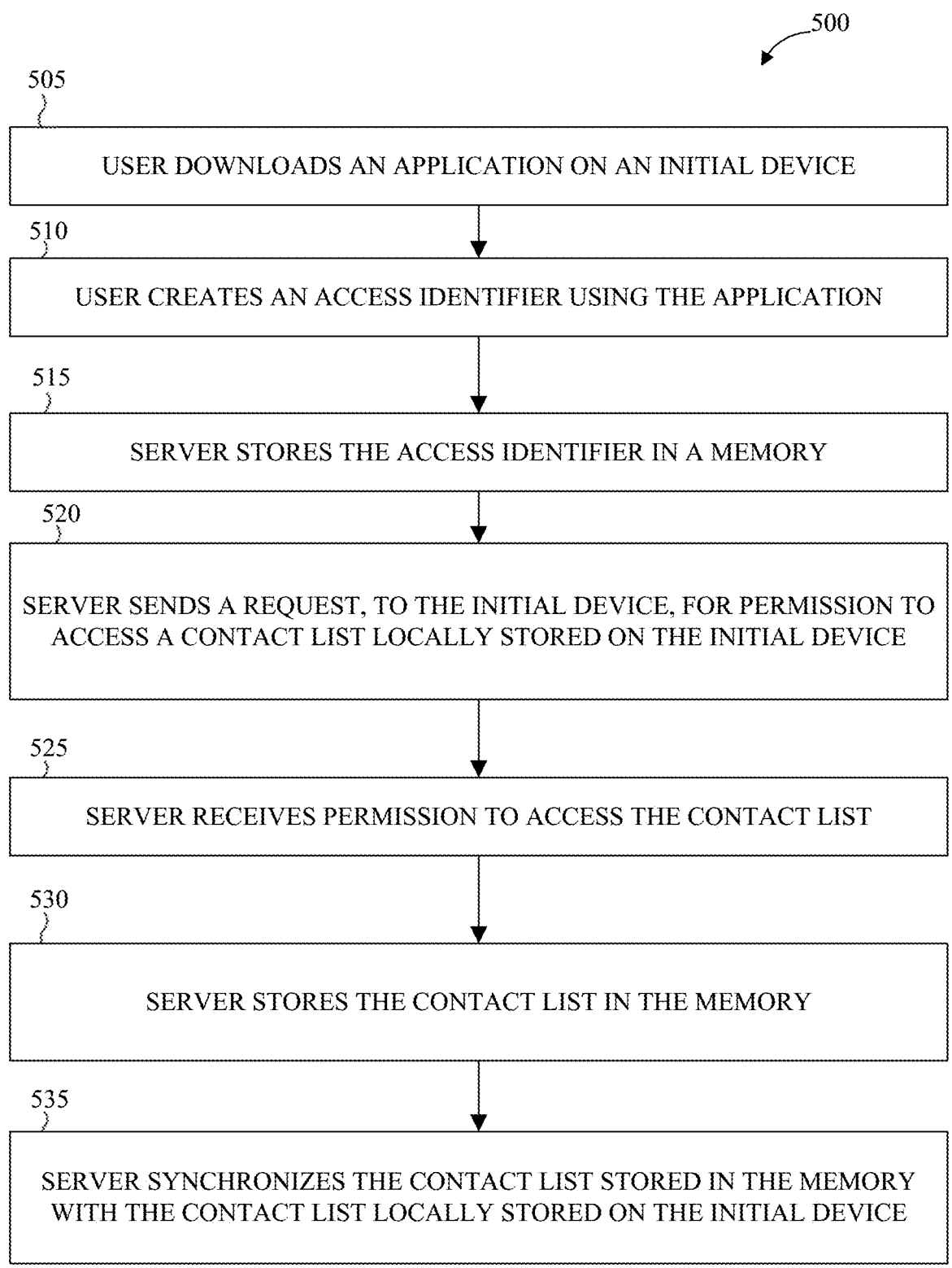
FIG. 5 illustrates an example process for accessing a contact list on a phone that is unavailable or unusable according to various embodiments of the present disclosure.

FIG. 5 illustrates an example process 500 for synchronizing a contact list on a phone that is accessible according to embodiments of the present disclosure. For example, the process 500 depicted in FIG. 5 may be performed by the electronic device 106-114 in FIG. 1 or the server 200 in FIG. 2.

In operation 505, a user downloads an application 231 on an initial device. The initial device is a functioning device that is operable by the user. The initial device is a device that belongs to a user and contains a contact list of contacts that the user has collected.

In operation 510, the user creates an access identifier 244 using the application 231. For example, the user can create a four-digit PIN on the application 231. The four-digit PIN can serve as a means for identifying the initial device. For instance, the four-digit PIN may represent the last four digits of the phone number associate with the initial device.

In operation 515, the server 200 can store the access identifier 244 in a memory.

In operation 520, the server 200 sends a request, to the initial device, for permission to access a contact list 241 locally stored on the initial device. For example, the request may be received by the user in the application 231. The user may also respond to the request by using the application 231.

In operation 525, the server 200 receives permission to access the contact list 241. For example, the server 200 may receive permission to access the contact list 241 from the application 231 on the initial device.

In operation 530, the server 200 stores the contact list in the memory.

In operation 535, the server 200 synchronizes the contact list stored in the memory with the contact list locally stored on the initial device. For example, the server 200 may periodically update the contact list stored in the memory by checking for changes made to the contact list locally stored on the initial device. The initial device in FIG. 5 can also be the inaccessible device in FIGS. 4, 6, and 7. For instance, while the initial device was originally operable by the user, the device can later become inaccessible for numerous reasons, such as a cracked phone screen or defective home button.

Although FIG. 5 illustrates an example process 500 for synchronizing a contact list on a phone that is accessible according to embodiments of the present disclosure, various changes could be made to FIG. 5. For example, while shown as a series of steps, various steps in each figure could overlap, occur in parallel, occur in a different order, or occur multiple times.

Figure 6:
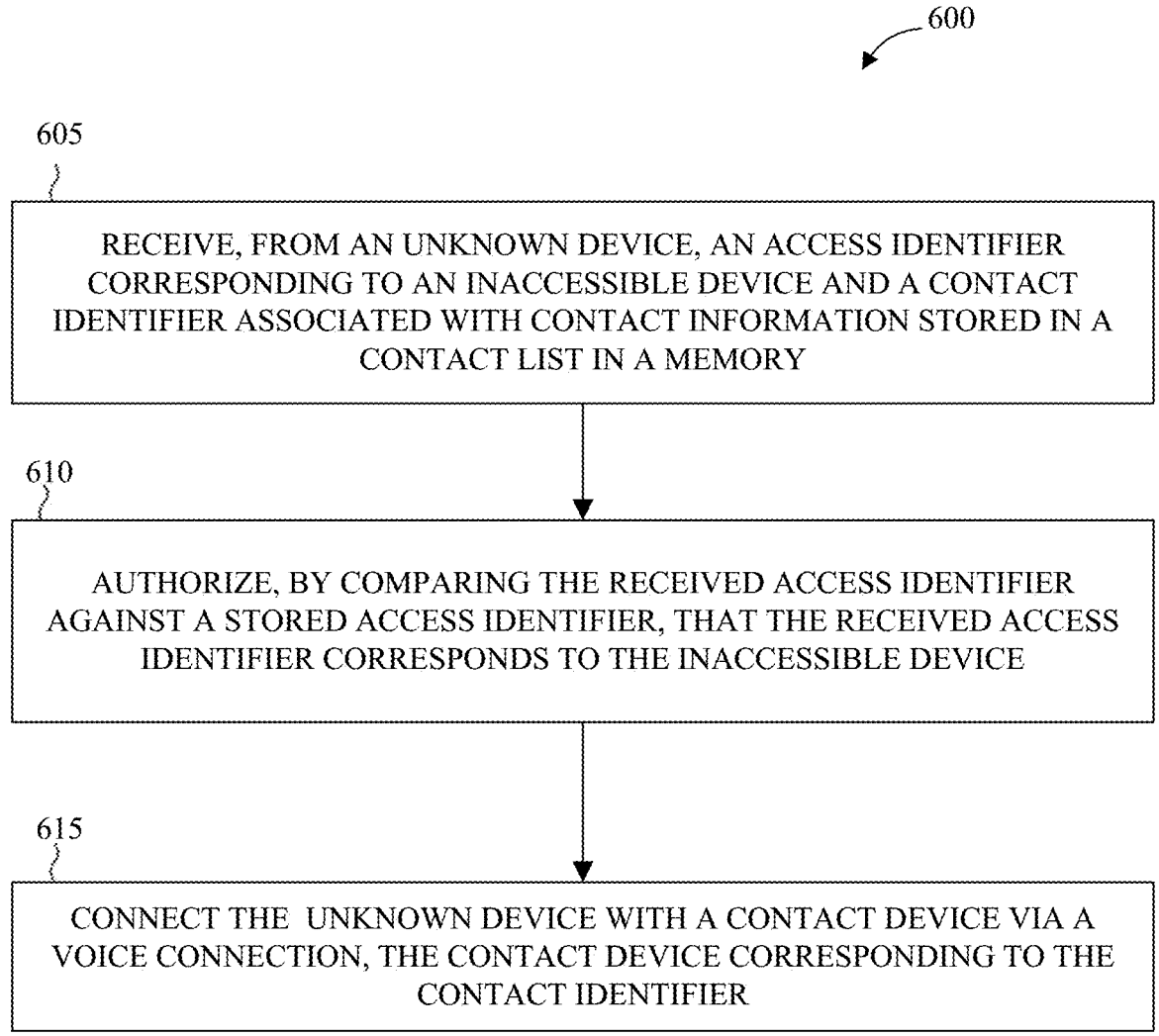
FIG. 6 illustrates an example process for accessing a contact list on a phone that is inaccessible according to embodiments of the present disclosure.

FIG. 6 illustrates an example process 600 for accessing a contact list 241 on a phone that is inaccessible according to embodiments of the present disclosure. For example, the process 600 depicted in FIG. 6 may be performed by the electronic device 106-114 in FIG. 1 or the server 200 in FIG. 2.

In operation 605, the server 200 receives, from an unknown device 406, an access identifier corresponding to an inaccessible device and a contact identifier associated with contact information stored in a contact list in a memory. The access identifier 244 and the contact identifier 247 can be received by the server 200 over a voice connection from the unknown device 406. For example, the user may call the server 200 from the unknown device 406 (i.e., a smartphone) and verbally speak the access identifier 244 or the contact identifier 247. The access identifier 244 can also be a numeric PIN entered by a user on the initial device. The voice connection includes campus calls, local calls, domestic long-distance calls, international calls, toll free calls, directory assistance calls, digital calls, and any other appropriate type of telephone call. The server can also be configured to receive, from an unknown device over a voice connection, an access identifier corresponding to the inaccessible device and a contact identifier 247 associated with a contact profile 270 of the plurality of contact profiles.

In operation 610, the server 200 authorizes, by comparing the received access identifier 244 against a stored access identifier, that the received access identifier 244 corresponds to the inaccessible device 404. The server 200 can also authenticate the user using the access identifier 244. The access identifier 244 can be a specific extension, an alphanumeric code, a user name and password, etc. The access identifier 244 provides the ability to identify the specific user corresponding to a stored user profile 242 whose own electronic device associated with the user profile 242 is inaccessible. The access identifier 244 can be a username 250, a password 260, or a combination of both. In one embodiment, the username 250 is a phone number 252 associated with the inaccessible device, and the password 260 is a PIN code 262 set up on the inaccessible device. The access identifier 244 and the PIN code 262 may comprise a four-digit PIN. The stored access identifier 244 may also comprise a four-digit PIN. In one embodiment, the server 200 compares the received four-digit PIN against a four-digit PIN stored in the memory. The four-digit PIN may have been previously stored in the memory by the server 200 when the user accessed the application 231. The server can also be configured to identify the contact list based on matching the access identifier with the inaccessible device. The server can further determine a contact device of the contact profile 270 in the contact list corresponding to the contact identifier 47. In one embodiment, the access identifier includes a username and a password. To identify the contact list, the processor is further configured to locate the contact list in the memory associated with the username, compare a stored password received with the access identifier, determine the contact device of the contact profile 270 when the stored password matches the received password, and disconnect the unknown device when the stored password does not match the received password.

In operation 615, the server 200 connects the unknown device 406 with a contact device 408 via a voice connection, the contact device 408 corresponding to the contact identifier 247. In some embodiments, the contact device 408 receives a caller ID corresponding to the inaccessible device 404 when the apparatus connects the unknown device 406 with the contact device 408 via a voice connection. For example, a user associated with the contact device 408, upon seeing the caller ID, may believe the call is coming directly from the inaccessible phone. The caller ID may state the call is coming from contact A (the phone number associated with the inaccessible phone) even though the call may ultimately be coming from the unknown device 406 (via the apparatus). The server can also be configured to connect, over the voice connection, the unknown device to the contact device corresponding to the contact. In one embodiment, a phone number of the inaccessible device is used in place of a phone number of the unknown device when connecting the contact device. The processor can also be configured to verbally provide a phone number for the contact device to the unknown device. The processor can also be configured to confirm the contact identifier 247 before connecting the unknown device to the contact device. The processor can also be configured to provide an alternative contact identifier when unable to determine the contact profile 270 corresponding to the contact identifier 247.

In one embodiment, the server 200 periodically sends a phone call or a text message, to a contact device 408 associated with the contact identifier 247, until the contact device 408 responds to the phone call or the text message. For example, the server 200 can attempt to contact a specific contact, a group of contacts, or the entire contact list 241 based on a user specification until one or more contacts answers the call or responds to a text message. The user can verbally give commands or give text commands. The communication can include phone calls, text messages, emails, or other forms of contact. The server 200 can be set to continuously attempt to reach contacts for a specified amount of time, until a call is ended, a message is closed or otherwise indicated as completed, etc. The server 200 may periodically send a phone call or text message based on time (i.e., send a phone call every fifteen minutes) or some other factor.

In another embodiment, the server 200 patches the unknown device 406 into a group call when the contact device 408 answers the phone call or the text message. For example, the user can have the calls or messages sent to the contact list 241 appear as if they were sent directly from the inaccessible device 404. The server 200 also can provide functionality to remain calling other contacts and patching them into a group conversation as they are answering the call or responding to messages. The group call may include three or more electronic devices, or two electronic devices with a third electronic device attempting to connect (i.e., in the process of forming a three-way call).

Although FIG. 6 illustrates an example process 600 for accessing a contact list 241 on a phone that is inaccessible according to embodiments of the present disclosure, various changes could be made to FIG. 6. For example, while shown as a series of steps, various steps in each figure could overlap, occur in parallel, occur in a different order, or occur multiple times.

Figure 7:
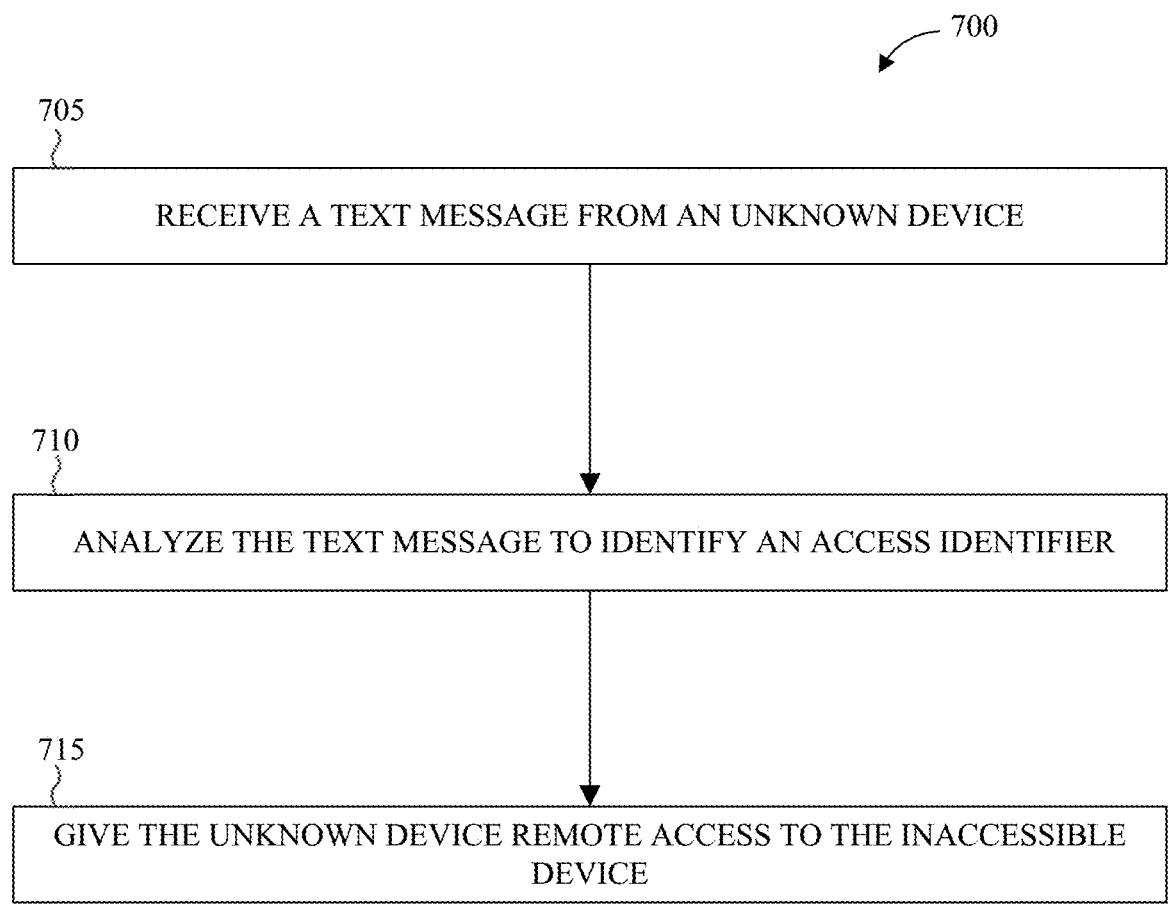
FIG. 7 illustrates an example process for accessing a contact list on a phone that is inaccessible according to embodiments of the present disclosure.

FIG. 7 illustrates an example process 700 for accessing a contact list 241 on a phone that is inaccessible according to embodiments of the present disclosure. For example, the process 700 depicted in FIG. 7 may be performed by the electronic device 106-114 in FIG. 1 or the server 200 in FIG. 2.

In operation 705, the server 200 receives a text message from an unknown device 406. For example, the text message may contain the user's first and last name followed by a short statement requesting the server to call an individual.

In operation 710, the server 200 analyzes the text message to identify an access identifier 244. For example, the server 200 can analyze the text message and identify the user's first and last name as an access identifier 244.

In operation 715, the server 200 gives the unknown device 406 remote access to the inaccessible device 404. For example, the user's phone is inaccessible and the user needs to get in touch with someone in a non-emergency situation or emergency situation. If the user is using a pay phone or another phone, the inaccessible phone may not be available for an extended period of time and a contact is needed to get ahold of as soon as possible. In one example, the server 200 can be configured to send the unknown device 406 a hyperlink that leads the user to an application. Using the application, the user can remotely access the inaccessible device 404 from the unknown device 406 (i.e., remotely accessing the inaccessible device 404 from a separate smartphone or computer).

In one embodiment, the server 200 encrypts the contact list 241 to prevent the apparatus from storing the contact list 241 and contact information 246 associated with the contact list 241 in the memory 230. In one embodiment, while the server 200 allows the user remote access to the inaccessible device 404, the server simultaneously encrypts all of the user's actions to prevent the server 200 from recording any of the user's actions. The encryption of the user's actions benefits the user because it provides privacy. Many current devices actively trace a user's actions and search history (known as metadata). Metadata is frequently sold to third parties without the user being aware. By encrypting the user's actions, the server 200 is unable to trace the user's metadata and thus cannot sell this metadata to a third party. The user may not even be aware that the server 200 is actively encrypting the user's actions.

Although FIG. 7 illustrates an example process 700 for accessing a contact list 241 on a phone that is inaccessible according to embodiments of the present disclosure, various changes could be made to FIG. 7. For example, while shown as a series of steps, various steps in each figure could overlap, occur in parallel, occur in a different order, or occur multiple times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

None of the description in this application should be read as implying that any particular element, step, or function is an essential element that trust be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus, comprising:
a memory configured to store a plurality of contact lists; and
a processor coupled to the memory, the processor configured to:
receive, from an unknown device, an access identifier corresponding to an inaccessible device and a group identifier associated with a group profile;
identify a contact list corresponding to the inaccessible device from the plurality of contact lists based on the access identifier;
determine a plurality of contact devices each related to a different user in a group in the contact list corresponding to the group identifier;
initiate communication with the plurality of contact devices for the different users in the group until a contact device is successfully contacted, wherein a phone number of the inaccessible device is used in place of a phone number of the unknown device when initiating communication with the plurality of contact devices; and
connect the unknown device to the contact device that is successfully contacted.

2. The apparatus of claim 1, wherein:
the access identifier includes a username and a password, and
to identify the contact list, the processor is further configured to:
locate the contact list in the memory associated with the username,
compare a stored password to the password included with the access identifier,
determine the plurality of contact devices when the stored password matches the password included with the access identifier, and
disconnect the unknown device when the stored password does not match the password included with the access identifier.

3. The apparatus of claim 2, wherein:
the username is a phone number associated with the inaccessible device, and
the password is a PIN code set up on the inaccessible device.

4. The apparatus of claim 1, wherein:
the communication initiated with the plurality of contact devices is a phone call, and
a connection between the unknown device and the contact device is a phone call.

5. The apparatus of claim 1, wherein:
the communication initiated with the plurality of contact devices is a text message, and
a connection between the unknown device and the contact device is a text chat.

6. The apparatus of claim 1, wherein, when a second contact device is contacted, connect the second contact device in a group conversation with the contact device and the unknown device.

7. The apparatus of claim 1, wherein to initiate communication occurs simultaneously with the different users in the group.

8. A method for an apparatus incorporating a memory and a processor, the memory configured to store a plurality of contact lists and the processor coupled to the memory, the method comprising:
- receiving, from an unknown device, an access identifier corresponding to an inaccessible device and a group identifier associated with a group profile;
- identifying a contact list corresponding to the inaccessible device from the plurality of contact lists based on the access identifier;
- determining a plurality of contact devices each related to a different user in a group in the contact list corresponding to the group identifier;
- initiating communication with the plurality of contact devices for the different users in the group until a contact device is successfully contacted, wherein a phone number of the inaccessible device is used in place of a phone number of the unknown device when initiating communication with the plurality of contact devices; and
- connecting the unknown device to the contact device that is successfully contacted.

9. The method of claim 8, wherein:
the access identifier includes a username and a password, identifying the contact list further comprises:
- locating the contact list in the memory associated with the username,
- comparing a stored password to the password included with the access identifier,
- determining the plurality of contact devices when the stored password matches the password included with the access identifier, and
- disconnecting the unknown device when the stored password does not match the password included with the access identifier.

10. The method of claim 9, wherein:
the username is a phone number associated with the inaccessible device, and
the password is a PIN code set up on the inaccessible device.

11. The method of claim 8, wherein:
the communication initiated with the plurality of contact devices is a phone call, and
a connection between the unknown device and the contact device is a phone call.

12. The method of claim 8, wherein:
the communication initiated with the plurality of contact devices is a text message, and
a connection between the unknown device and the contact device is a text chat.

13. The method of claim 8, wherein, when a second contact device is contacted, connect the second contact device in a group conversation with the contact device and the unknown device.

14. The method of claim 8, wherein initiating communication occurs simultaneously with the different users in the group.

15. A non-transitory computer-readable medium storing instructions that, when executed, causes a processor to:
- receive, from an unknown device, an access identifier corresponding to an inaccessible device and a group identifier associated with a group profile;
- identify a contact list corresponding to the inaccessible device from a plurality of contact lists based on the access identifier;
- determine a plurality of contact devices each related to a different user in a group in the contact list corresponding to the group identifier;
- initiate communication with the plurality of contact devices for the different users in the group until a contact device is successfully contacted, wherein a phone number of the inaccessible device is used in place of a phone number of the unknown device when initiating communication with the plurality of contact devices; and
- connect the unknown device to the contact device that is successfully contacted.

16. The non-transitory computer-readable medium of claim 15, wherein:
the access identifier includes a username and a password, to identify the contact list, the instructions further cause the processor to:
- locate the contact list in a memory associated with the username,
- compare a stored password to the password included with the access identifier,
- determine the plurality of contact devices when the stored password matches the password included with the access identifier, and
- disconnect the unknown device when the stored password does not match the password included with the access identifier.

17. The non-transitory computer-readable medium of claim 16, wherein:
the username is a phone number associated with the inaccessible device, and
the password is a PIN code set up on the inaccessible device.

18. The non-transitory computer-readable medium of claim 15, wherein:
the communication initiated with the plurality of contact devices is a phone call, and
a connection between the unknown device and the contact device is a phone call.

19. The non-transitory computer-readable medium of claim 15, wherein:
the communication initiated with the plurality of contact devices is a text message, and
a connection between the unknown device and the contact device is a text chat.

20. The non-transitory computer-readable medium of claim 15, wherein, when a second contact device is contacted, connect the second contact device in a group conversation with the contact device and the unknown device.

21. The non-transitory computer-readable medium of claim 15, wherein to initiate communication occurs simultaneously with the different users in the group.

* * * * *